March 29, 1938.   D. I. REITER   2,112,707
BAG STRAP FASTENER
Filed Oct. 14, 1937
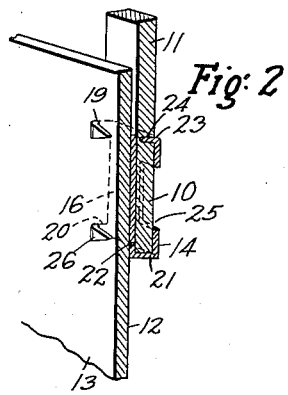
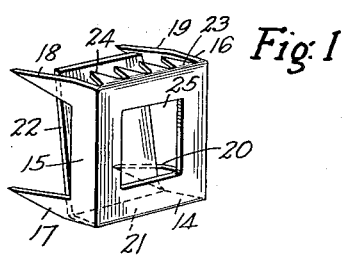
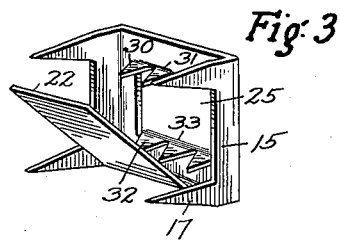
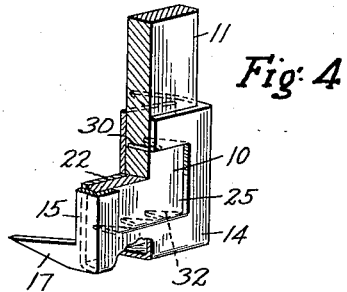
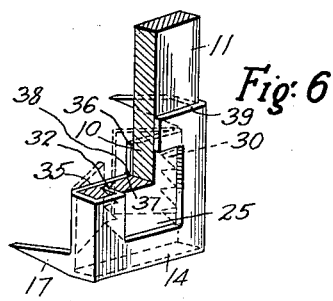
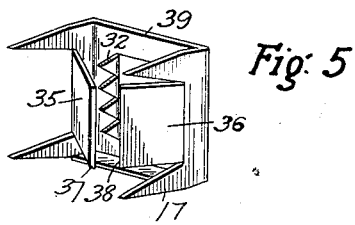
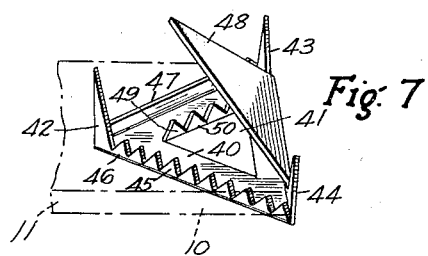
INVENTOR.
Daniel I. Reiter
BY
ATTORNEY.

Patented Mar. 29, 1938

2,112,707

UNITED STATES PATENT OFFICE 2,112,707

BAG-STRAP FASTENER

Daniel I. Reiter, New York, N. Y.

Application October 14, 1937, Serial No. 168,861

7 Claims. (Cl. 24—265)

This invention relates to bag-strap fasteners and particularly to that type intended to hold the end of a handle strap to a hand bag such as a pocketbook, and which is inherently designed to present an ornamental appearance.

My invention contemplates the provision of a fastener into which the end of the strap may be quickly and easily inserted, and which is adapted for attachment to a face of the bag in a single operation.

My invention further contemplates the provision of a simple and inexpensive strap-end fastener adapted for economical production and while functionally efficient, being also adapted for ornamental purposes, and in which the strap end is held close to the bag thereby avoiding projecting parts likely to be caught by other articles and causing damage.

The various objects of the invention will be clear from the description which follows and from the drawing, in which, Fig. 1 is a perspective view of a now preferred form of my improved fastener.

Fig. 2 is a similar view partly in section and showing the fastener in position and holding the strap to a sheet forming part of the bag.

Fig. 3 is a perspective view of a modified form of the fastener.

Fig. 4 is a combined perspective view and partial sectional view showing the fastener of Fig. 3 assembled with a strap.

Fig. 5 is a perspective view of another modified form of the fastener wherein a pair of opposed plates are used.

Fig. 6 is a view similar to Fig. 4 of the fastener of Fig. 5.

Fig. 7 is a perspective view of a modified form of the fastener showing how the shape thereof and the arrangement of the teeth may be varied.

In the practical embodiment of my invention which I have shown by way of example, my improved fastener is preferably made of a single piece of sheet metal being provided with attaching prongs and with strap-holding means comprising a toothed member and a bendable plate cooperating with the toothed member to hold the strap end therebetween. As shown in Figs. 1 and 2, the end portion 10 of the strap 11 is held by the fastener close to a face as 12 of the bag body 13. The fastener comprises an outer wall 14, side flanges 15 and 16 depending from the outer wall, pointed attaching prongs 17, 18, 19 and 20 extending from the flanges, an end flange 21 from which extends integrally the bearing plate 22, and an opposed end flange 23 provided with teeth 24, or prongs or the like.

The outer wall 14 may be provided, if desired, with an opening 25 of any desired shape for ornamental purposes and to expose part of the strap end 10 to view, though the wall may be left imperforate without affecting the efficient operation of the fastener. The depth or width of each of the flanges 15, 16, 21 and 23 is approximately equal to the thickness of the strap end, while the length of each of the attaching prongs is sufficient to permit said prongs to be passed through the sheet 13 forming part of the bag and to be clenched over on the rear face of said sheet. The plate 22 is bendable about that end thereof adjacent the flange 21, and is of sufficient length and width to press the strap end 10 against the prongs 24 and to force said strap end in the recess provided between the side and end flanges of the fastener.

To secure the strap end in place, said end is first inserted in the fastener by arranging the rear face thereof against the front face of the plate 22, which plate is initially in the inclined position shown in Fig. 1, whereby sufficient space is provided for the quick and easy insertion of the strap end in place between the prongs 24 and the plate and the flanges of the fastener. The fastener and strap end are then arranged at their proper places on the bag or sheet 13 and the attaching prongs forced through the sheet 13 and turned over as at 26. It will be understood that as the prongs are forced into the bag and clenched, the plate 22 is simultaneously forced against the rear face of the strap end and bent until the plate can be bent no further owing to the resistance of the strap, or the engagement of the plate with the flanges. At this time the teeth 24 enter the strap end and hold it firmly in place against removal. From the above, it will be seen that the attaching prongs are clenched, the plate 22 bent and the prongs 24 forced into the strap simultaneously and in one operation.

It will further be seen that my improved fastener facilitates the arrangement of the strap end in position within the fastener and holds the strap end portion close to the face 12 of the bag thereby avoiding projecting parts likely to catch other articles, and that the teeth 24 may be arranged to project from any desired point of the wall 14.

In that form of the invention shown in Figs. 3 and 4, the prongs 24 and the flange 23 have been omitted and in place thereof, the teeth 30 are provided on an edge 31 of the opening 25. If desired, additional projecting teeth as 32 may be provided on the opposite edge 33 of said opening. In any case, the strap is inserted in front of the initially inclined plate 22 in the same manner as hereinbefore described in connection with Figs. 1 and 2 and the fastener and strap end assembled with the bag in the same manner into the position shown in Fig. 4. In said figure, the bag is not shown but the plate 22 and strap end 10 are shown in the positions assumed thereby when the parts are secured to the bag.

Referring now to Figs. 5 and 6, a form of the invention similar to that shown in Figs. 3 and 4 is disclosed insofar as the teeth or prongs 30 and 32 are concerned but for the plate 22 has been substituted a pair of plates 35 and 36. Each of said plates is of substantially half the length of the fastener so that when the plates are in their final assembled position as shown by the full lines representing said plates in Fig. 6, the inner edges 37 and 38 of the plates are closely adjacent each other. The initial inclination of the plates 35 and 36 give sufficient room in front thereof to insert the bag end past the edge 39 and into the recess rearwardly of the wall 14 and in front of the plates. Each of said plates is integrally joined to the adjacent flange and bendable about said flange as a fulcrum.

As shown in Fig. 7, the outer wall of the fastener may take any desired shape, the wall 40 being illustrated as in the form of a triangle having a triangular opening 41. In this form of the invention, an attaching prong is provided at each of the corners of the fastener so that only three prongs 42, 43 and 44 are provided, it being understood, however, that as many prongs as may be found necessary are used. As shown, the teeth as 45 are provided on the flange 46, the flange 47 being left unserrated. Said teeth enter the strap end 10 in the manner hereinbefore described and the triangular plate 48 presses said strap end forwardly when the fastener is attached to the bag in the same manner as hereinbefore described in connection with the plates 22, 35 and 36.

It will be understood, however, that the teeth 45 may be arranged at one or more of the edges of the opening 41, or at any suitable point on the wall 40. For example, the teeth 49 have been illustrated in Fig. 7 as outstanding from the edge 50 of the opening 41, said teeth operating in the same manner as the teeth 30 of Figs. 3 to 5 inclusive by cooperating with the plate 48 to force said teeth to enter the strap end. In the form shown in Fig. 7, the strap end 10 may be arranged in a number of different ways depending on whether the apex or an edge of the triangular fastener is to be arranged uppermost. If the apex is arranged uppermost, the attaching prong 42 is forced through the strap end portion at the same time that the prongs are forced into the bag. If, however, an edge of the triangle is to be arranged uppermost, then the strap end is cut off at an angle and inserted past the flange 46 until it rests against the flange 47, whereafter the parts are assembled to the bag in the manner hereinbefore described.

It will be seen that I have provided a simple but efficient one-piece fastener together with means thereon for adequately holding a bag strap to a bag and by means of which the parts may be assembled in their final positions with ease and rapidity and in a single operation, and that the bendable plate cooperates with the relatively fixed teeth to secure the strap in place.

While I have shown and described certain specific embodiments of my invention, I do not wish to be understood as limiting myself thereto, but intend to claim the invention as broadly as may be permitted by the state of the prior art and the scope of the appended claims.

I claim:

1. In a one-piece bag-strap fastener, a wall, flanges extending from the wall and forming therewith a recess arranged completely on the rear side of the wall, rearwardly projecting strap-engaging teeth on at least one of said flanges, and a relatively bendable plate flat throughout its entire area, and arranged rearwardly of the teeth and fulcrumed on an edge of said plate in spaced relation to said teeth, said plate being of sufficient area to extend past said teeth when bent into a plane at substantially right angles to the plane of the teeth.

2. In a one-piece bag-strap fastener, a wall, a row of relatively fixed strap-engaging teeth projecting from the wall, and a relatively movable flat plate arranged rearwardly of said teeth and in a plane positioned at an acute angle to the plane of the teeth, said plate being at least as wide as the length of the row of teeth and at least half as long as said wall, said plate being swingable into a position at substantially right angles to the plane of and adjacent the teeth and about one end of the plate as a fulcrum to press the plate against the wall and toward said teeth and to maintain the end part of a bag strap inserted into said fastener entirely on the rear side of the wall.

3. A bag-strap fastener comprising an outer front wall member, flange members depending rearwardly and integrally from said wall member, attaching prongs extending rearwardly from the flange members, rearwardly projecting teeth on at least one of said members, the flange members forming a recess therebetween and between said flange members and wall member for the reception of a strap end, said recess being partly obstructed by said teeth, and a plate flat throughout its entire area and terminating in a straight free end edge, said plate extending angularly and integrally from one of said members and fulcrumed about an end thereof for swinging movement about said end and toward the recess into a position substantially parallel to the wall member to close a face of said recess, the width of said plate being equal to the width of the recess and the length of the plate being such that the plate extends past said teeth when said plate is moved into said position and cooperates with said teeth to confine said strap end therebetween with all parts of said strap end arranged rearwardly of the wall member.

4. In a bag-strap fastener, a front wall having outer peripheral edges and having an opening providing inner peripheral edges on said wall, strap-engaging teeth extending rearwardly from at least one of said edges, and a plate terminating in a straight free edge extending rearwardly and angularly from another of said edges, and fulcrumed for movement toward the teeth, said plate being substantially coextensive with said wall.

5. In a one-piece bag-strap fastener, a front wall, teeth projecting from an edge of said wall, attaching means for the fastener, and bendable plate means projecting from an opposite edge of the wall and movable toward and cooperating with the teeth to secure therebetween a strap inserted between the plate and the teeth, the area of said plate means being substantially the same as that of said wall.

6. In a one-piece bag-strap fastener, a front wall provided with an opening, teeth projecting rearwardly from an edge of the opening, and a pair of bendable plates each joined at one end thereof to an outer edge of the wall parallel to the plane of the teeth and bendable about said end toward the teeth, each of said plates extending half-way across said wall, and one of said plates extending past said teeth.

7. In a one-piece bag-strap fastener, an outer wall having a substantially central opening therein of insufficient size for the passage of a bag strap thereinto but of sufficient size to expose to view part of a bag strap arranged underneath said wall, a pair of side flanges of uniform width depending from said wall, attaching prongs projecting from each of the flanges, an end flange provided with teeth extending at substantially right angles to and from one end of said wall, a second end flange extending at right angles to and from the other end of the wall, said flanges being of substantially the same width, and a bendable plate flat throughout its entire area and having a free straight and uninterrupted end adjacent to and adapted to be bent toward said teeth about said second end flange as a fulcrum into parallel relation to said wall when the attaching prongs are passed into and clenched on a bag part, all of said prongs exerting pressure on said plate through said bag part when clenched to maintain said plate in position and said plate exerting pressure upon the entire face of that part of a strap inserted between said teeth and the plate to cause said teeth to enter the opposite face of the strap when the fastener is secured to a bag, and the wall exerting pressure on the entire opposite face of said inserted part of the strap except at said opening.

DANIEL I. REITER.